United States Patent
Sugawara et al.

(10) Patent No.: US 8,573,788 B2
(45) Date of Patent: Nov. 5, 2013

(54) IMAGE PROJECTING APPARATUS HAVING AN OPTICAL ELEMENT SHIFTABLE IN A DIRECTION HAVING A COMPONENT PERPENDICULAR TO AN OPTICAL AXIS

(75) Inventors: Saburo Sugawara, Utsunomiya (JP); Kazuhiro Inoko, Utsunomiya (JP); Makoto Takahashi, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 346 days.

(21) Appl. No.: 12/891,691

(22) Filed: Sep. 27, 2010

(65) Prior Publication Data

US 2011/0080565 A1    Apr. 7, 2011

(30) Foreign Application Priority Data

Oct. 2, 2009   (JP) .................... 2009-230416

(51) Int. Cl.
 *G02B 15/173* (2006.01)
 *G02B 15/177* (2006.01)

(52) U.S. Cl.
 USPC .......................... 353/101; 359/557

(58) Field of Classification Search
 USPC .......... 353/100, 101; 359/557, 399, 364, 433, 359/554, 570, 646, 684, 690, 726, 728
 See application file for complete search history.

(56) References Cited

U.S. PATENT DOCUMENTS

| | | | |
|---|---|---|---|
| 6,038,068 A * | 3/2000 | Takeshi et al. | 359/399 |
| 6,113,240 A * | 9/2000 | Iizuka | 353/31 |
| 6,220,713 B1 | 4/2001 | Tadic-Galeb et al. | |
| 6,880,937 B2 * | 4/2005 | Hayashi | 353/101 |
| 7,009,776 B2 | 3/2006 | Wada | |
| 7,123,422 B2 * | 10/2006 | Suzuki | 359/690 |
| 7,593,164 B2 * | 9/2009 | Souma | 359/676 |
| 7,630,139 B2 * | 12/2009 | Souma | 359/676 |
| 7,822,331 B2 * | 10/2010 | Takahashi | 396/55 |
| 2003/0103266 A1 * | 6/2003 | Wada | 359/649 |
| 2004/0184163 A1 * | 9/2004 | Nishioka et al. | 359/726 |
| 2005/0190447 A1 * | 9/2005 | Misaka | 359/557 |
| 2006/0152806 A1 * | 7/2006 | Noguchi et al. | 359/557 |

(Continued)

FOREIGN PATENT DOCUMENTS

| | | |
|---|---|---|
| CN | 1417616 A | 5/2003 |
| JP | 2005-274837 A | 10/2005 |

OTHER PUBLICATIONS

Chinese Office Action issued in corresponding CN 201010296013.X, dated Oct. 21, 2011. English translation provided.
Extended search report issued in corresponding European patent application No. 10182963.8-2217, dated Mar. 30, 2011.

*Primary Examiner* — Francis M Legasse, Jr.
*Assistant Examiner* — Bao-Luan Le
(74) *Attorney, Agent, or Firm* — Rossi, Kimms & McDowell LLP (57) ABSTRACT

An image projecting apparatus includes an image display element, an optical system that projects an image displayed on the image display element onto a screen, an optical element that shifts in a direction perpendicular to an optical axis of the optical system, an adjusting mechanism that can shift the optical element in the direction perpendicular to the optical axis, and a holding member that fixes the optical element to a lens barrel, wherein a combined Abbe number vdch of materials of the optical element with respect to a d-line, a combined focal length fdch of the optical element with respect to the d-line, and the pixel pitch P of the image display element satisfy an appropriate condition.

8 Claims, 5 Drawing Sheets

(56) References Cited

U.S. PATENT DOCUMENTS

| | | | |
|---|---|---|---|
| 2008/0030872 A1* | 2/2008 | Nishioka et al. | 359/683 |
| 2009/0002842 A1* | 1/2009 | Souma | 359/684 |
| 2009/0290216 A1* | 11/2009 | Fujisaki | 359/557 |
| 2009/0310228 A1* | 12/2009 | Shinohara | 359/687 |
| 2011/0169974 A1* | 7/2011 | Take et al. | 348/208.12 |

* cited by examiner

A LIQUID CRYSTAL PROJECTOR INCLUDING THE IMAGE PROJECTION APPARATUS OF THE PRESENT INVENTION

FIG. 10

IMAGE PROJECTING APPARATUS HAVING AN OPTICAL ELEMENT SHIFTABLE IN A DIRECTION HAVING A COMPONENT PERPENDICULAR TO AN OPTICAL AXIS

BACKGROUND OF THE INVENTION

1. Field of the Invention

The present invention relates to an image projecting apparatus. More particularly, the present invention relates to an image projecting apparatus that projects an image displayed on an image display element onto a screen at an enlarged scale using a projection lens (or projection optical system).

2. Description of the Related Art

Image projecting apparatuses that project an image of an image display element (such as a liquid crystal panel) onto a screen through a projection lens to provide an image are widely used. Assembly of lenses and lens units each composed of a plurality of lenses that constitute a projection lens into a lens barrel involves assembly errors, which will generate parallel decentration. In consequence, color shift occurs in projected images.

If large color shift occurs in the projection lens, images of three colors (red, green and blue) projected on the screen will be separated. This leads to a significant deterioration in the resolution (or image quality). Such deterioration in the image quality due to color shift also occurs similarly in an image pickup lens used in a camera that takes an image of an object. In connection with color shift, U.S. Pat. No. 6,038,068 discloses an optical system that is designed to reduce color shift caused by air dispersion. Further, Japanese Patent Application Laid-Open No. 2005-274837 discloses a zoom lens that has a decentration adjusting function to reduce effects of assembly errors on aberrations in an optical system composed of a plurality of lenses or lens units.

If an assembly error occurs upon assembling a plurality of lenses or lens units that constitute an optical system into a lens barrel, decentering aberrations are generated, and in particular large decentering lateral chromatic aberration is generated. The decentering lateral chromatic aberration refers to color shift in the direction perpendicular to the optical axis on the optical axis due to parallel decentration caused by an assembly error. The decentering lateral chromatic aberration leads to color shift in projected images in the case of projection lenses and color shift in images in the case of image pickup lenses, which causes a significant deterioration in the image quality. This problem has become more serious in recent years with an increase in the resolution of image display elements. It is very difficult to assemble a plurality of lenses and lens units in a lens barrel without assembly errors. Thus, it is a very effective method to decenter a lens(es) or a lens unit(s) which compose an optical system thereby reducing deterioration in the optical performance due to the assembly errors. However, it is still difficult to reduce color shift effectively by simple decentration adjustment of an optical element(s). In order to reduce color shift, it is important to appropriately select the optical elements in the optical system for which decentration adjustment is to be performed and to design the optical elements appropriately.

SUMMARY OF THE INVENTION

An image projecting apparatus comprises an image display element, an optical system that projects an image displayed on the image display element onto a screen, optical element that shifts in a direction having a component in a direction perpendicular to an optical axis of the optical system, an adjusting mechanism that can shift the optical element in a direction having a component in the direction perpendicular to the optical axis, and a holding member that fixes the optical element to a lens barrel, wherein the following conditions are satisfied:

$\nu dch < 35$, and $0.5(\text{mm}^2) < |P \times fdch| < 1.3(\text{mm}^2)$, where $\nu dch$ is a combined Abbe number of materials of the optical element with respect to a d-line, $fdch$ is a combined focal length of the optical element with respect to the d-line, and P is a pixel pitch of the image display element.

Further features of the present invention become apparent from the following description of exemplary embodiments with reference to the attached drawings.

DESCRIPTION OF THE EMBODIMENTS

Preferred embodiments of the present invention will now be described in detail in accordance with the accompanying drawings.

The image projecting apparatus according to the present invention comprises an image display element composed of a liquid crystal panel as like, and an optical system, such as a projection lens having a single focal length or a zoom lens including a magnification-varying lens unit, which projects an image displayed on the image display element onto a screen. The optical system has an optical element consisting of a single lens or an optical element including a positive lens and a negative lens, and the optical element is shifted in a direction having a component in a direction perpendicular to the optical axis (or having a component perpendicular to the optical axis). The optical system is further provided with an adjusting mechanism that can shift the optical element in a direction having a component perpendicular to the optical axis or a holding member that fix the optical element to a fixed barrel after the optical element has been shifted in a direction having a component perpendicular to the optical axis.

Thus, it is possible to reduce effectively a decentering lateral chromatic aberration with a simple structure. The decentering lateral chromatic aberration is generated by assembly errors occurring during the assembly of individual optical elements into the lens barrel.

Figure 1:
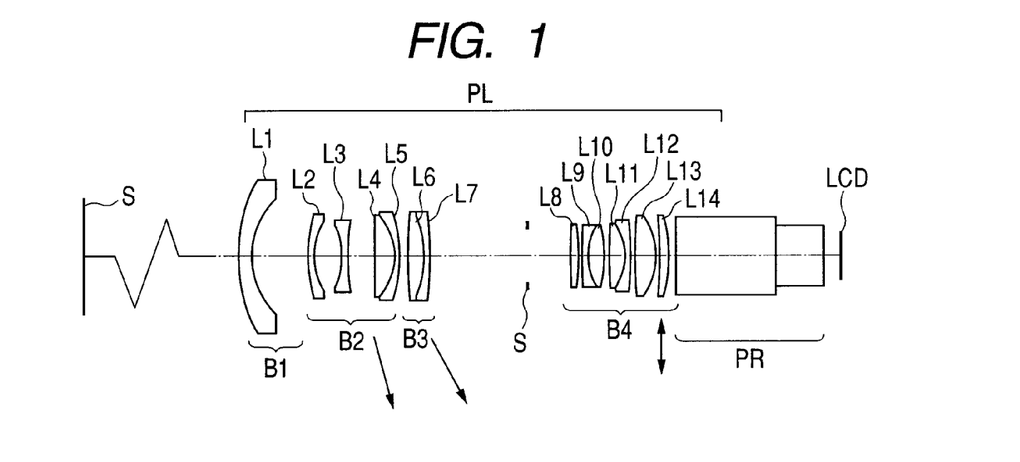
FIG. 1 is a schematic cross sectional view of a main part of an image projecting apparatus having an optical system according to a first embodiment of the present invention.

FIG. 1 is a schematic view of a main part of an image projecting apparatus (specifically, a liquid crystal video projector) using a projection lens having a single focal length as an optical system according to a first embodiment.

Figure 2A:
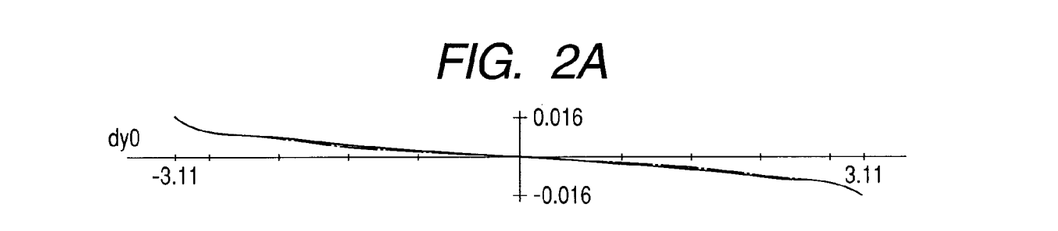
FIG. 2A is an aberration diagram in a case where there is no decentration of lenses in the optical system according to the first embodiment of the present invention.
Figure 2B:
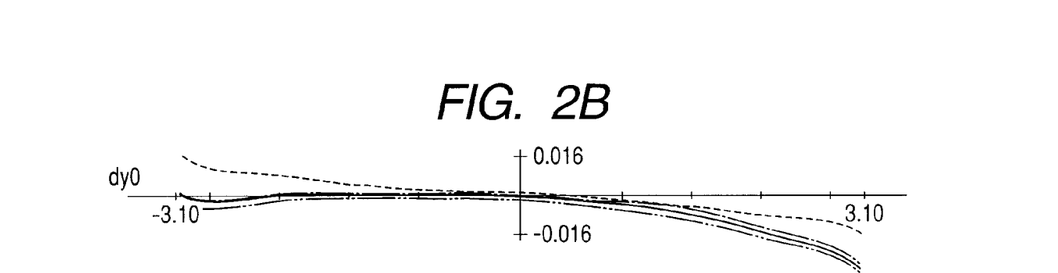
FIG. 2B is an aberration diagram in a case where there is decentration of a lens L2 in the optical system according to the first embodiment of the present invention.
Figure 2C:
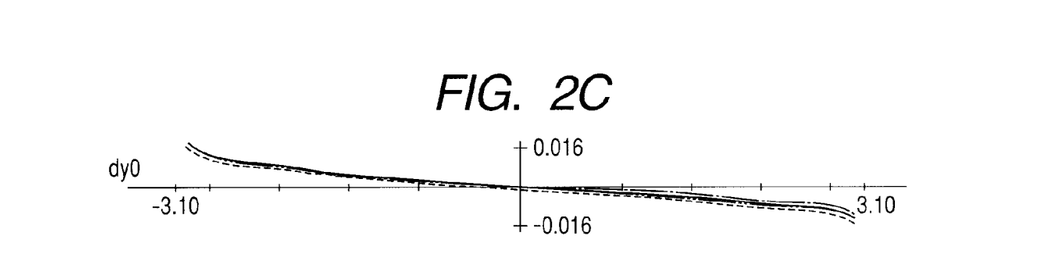
FIG. 2C is an aberration diagram in a case where color shift is corrected by a lens L14 in the optical system according to the first embodiment of the present invention.

FIGS. 2A, 2B and 2C are lateral aberration diagrams respectively in a case where there is no decentration of lenses, in a case where there is decentration of a lens L2, and in a case where color shift is corrected by a lens (optical element) L14, in the optical system according to the first embodiment. In the aberration diagrams, the solid lines are for the d-line, the chain double-dashed lines are for the g-line, the alternate long and short dashed lines are for the C-line, and the broken lines are for the F-line.

Figure 3:
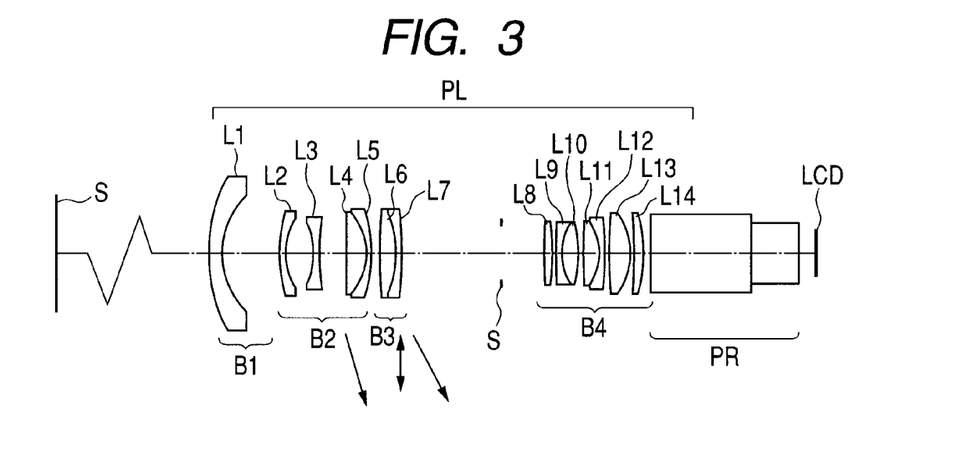
FIG. 3 is a schematic cross sectional view of a main part of an image projecting apparatus having an optical system according to a second embodiment of the present invention.

FIG. 3 is a schematic view of a main part of an image projecting apparatus (specifically, a liquid crystal video projector) using a projection lens having a single focal length as an optical system according to a second embodiment.

Figure 4A:
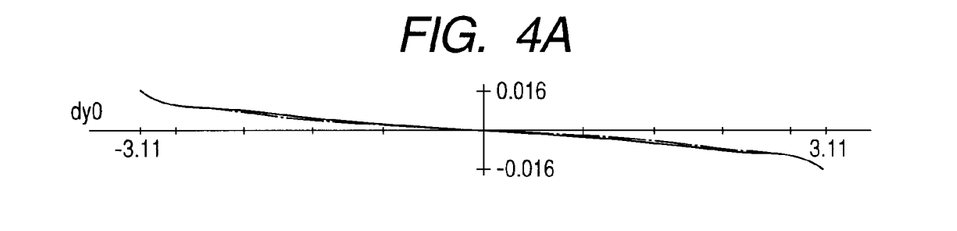
FIG. 4A is an aberration diagram in a case where there is no decentration of lenses in the optical system according to the second embodiment of the present invention.
Figure 4B:
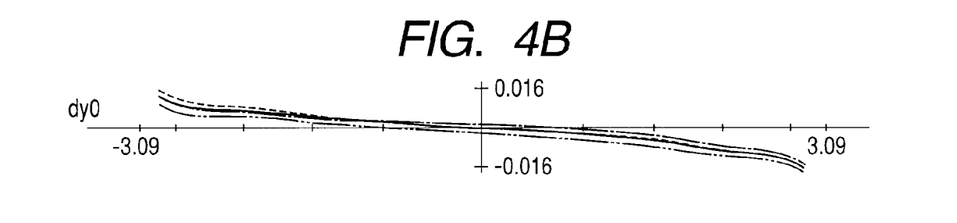
FIG. 4B is an aberration diagram in a case where there is decentration of a lens L1 in the optical system according to the second embodiment of the present invention.
Figure 4C:
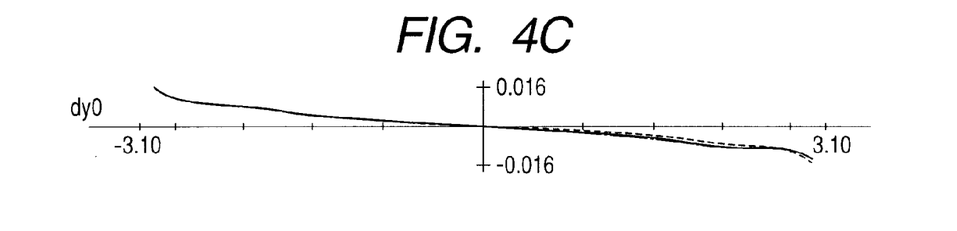
FIG. 4C is an aberration diagram in a case where color shift is corrected by the third lens unit B3 in the optical system according to the second embodiment of the present invention.

FIGS. 4A, 4B and 4C are lateral aberration diagrams respectively in a case where there is no decentering of lenses, in a case where there is decentration of a lens L1, and in a case where color shift is corrected by the third lens unit (optical element) B3, in the optical system according to the second embodiment.

Figure 5:
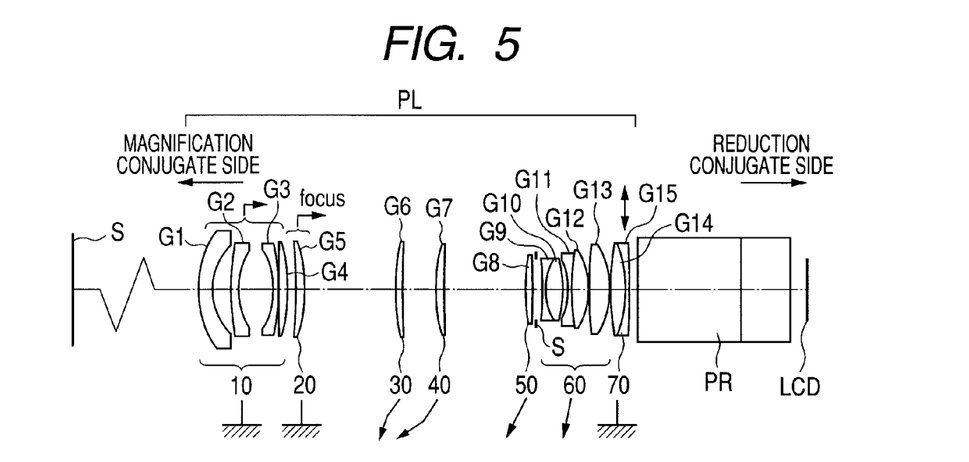
FIG. 5 is a schematic cross sectional view of a main part of an image projecting apparatus having an optical system according to a third embodiment of the present invention.

FIG. 5 is a schematic view of a main part of an image projecting apparatus (specifically, a liquid crystal video projector) using a zoom lens as an optical system according to a third embodiment in the state at the wide angle end.

Figure 6A:
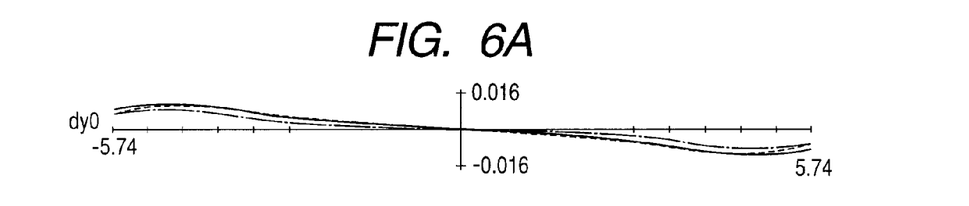
FIG. 6A is an aberration diagram in a case where there is no decentration of lenses in the optical system according to the third embodiment of the present invention.
Figure 6B:
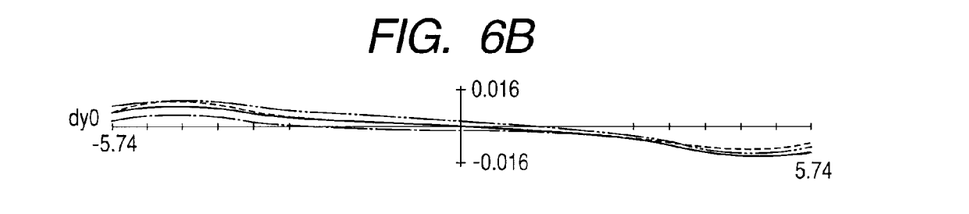
FIG. 6B is an aberration diagram in a case where there is decentration of a lens G5 in the optical system according to the third embodiment of the present invention.
Figure 6C:
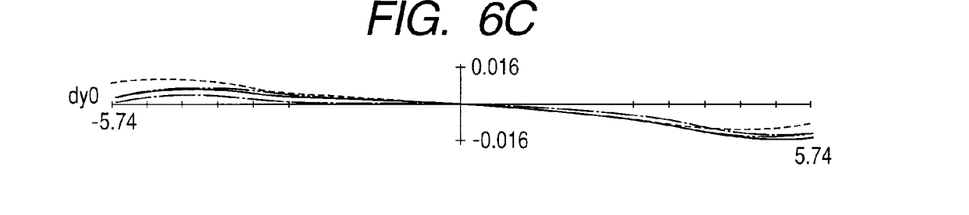
FIG. 6C is an aberration diagram in a case where color shift is corrected by the seventh lens unit 70 in the optical system according to the third embodiment of the present invention.

FIGS. 6A, 6B and 6C are lateral aberration diagrams respectively in a case where there is no decentering of lenses, in a case where there is decentration of a lens G5 (second lens unit 20), and in a case where color shift is corrected by the seventh lens unit (optical element) 70, in the optical system according to the third embodiment.

Figure 7A:
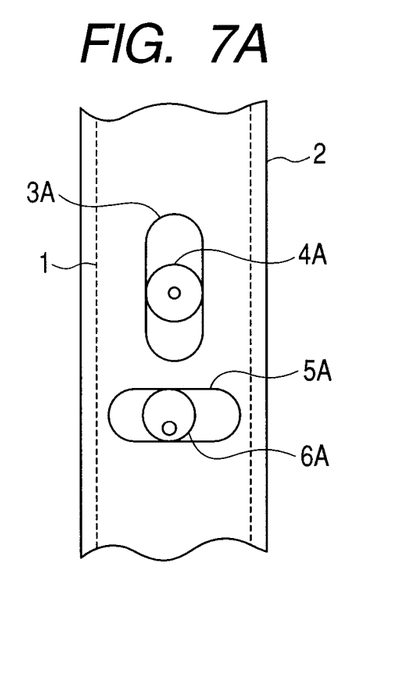
FIG. 7A illustrates a structure of a parallel decentration adjusting mechanism according to the present invention.
Figure 7B:
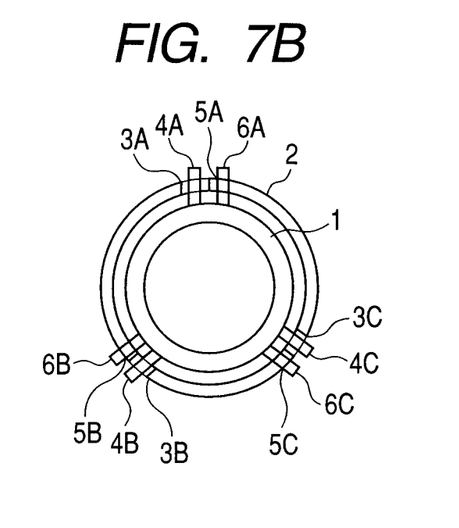
FIG. 7B illustrates a structure of a parallel decentration adjusting mechanism according to the present invention.
Figure 8:
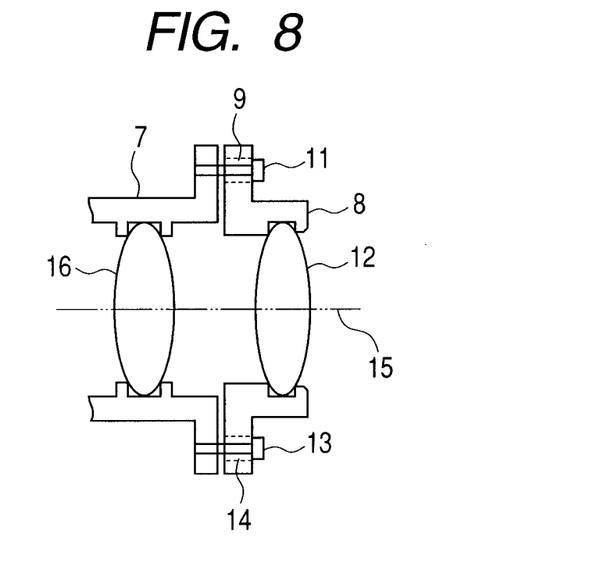
FIG. 8 illustrates a structure of a lens barrel that enables parallel decentration according to the present invention.

FIGS. 7A, 7B and 8 are schematic views of main parts of a parallel decentration adjusting mechanism of a lens according to the present invention.

In the image projecting apparatus according to the first to third embodiments, an image displayed on a liquid crystal panel LCD (image display element) is projected onto a screen surface S at an enlarged scale through the optical system (or projection lens) PL.

The screen surface S (projection surface) and the liquid crystal panel LCD (image display element) are located at the object plane and at the image plane of the optical system PL, respectively. The screen surface S and the liquid crystal panel LCD are conjugate with each other. The screen surface S is typically located at a conjugate point on a longer distance side or a magnification side (i.e. front or magnification conjugate point), and the liquid crystal panel LCD is located at a conjugate point on a shorter distance side or a reduction side (i.e. rear or reduction conjugate point).

The optical system PL also includes glass blocks PR such as a color combining prism, a polarizing filter, and/or a color filter on an optical design requirement. The optical system PL is mounted on the body of a liquid crystal video projector (not shown) by means of a joining member (not shown). The liquid crystal display panel LCD arranged subsequent to the glass block PR is included in the body of the projector. The liquid crystal panel LCD is illuminated with light emitted from an illumination optical system (not shown) arranged in the reduction side.

In each embodiment, the optical system PL has an optical element that shifts in a direction having a component vertical to the optical axis to correct color shift (or decentering lateral chromatic aberration) in a direction perpendicular to the optical axis on the optical axis. Here, let vdch be a combined Abbe number of the material(s) of the optical element with respect to the d-line, fdch be a combined focal length of the optical element with respect to the d-line, and P be a pixel pitch of the image display element. Then, the following conditions are satisfied:

$$vdch < 35 \quad (1)$$

$$(mm^2) < |P \times fdch| < 1.3(mm^2) \quad (2)$$

In addition, let IMG be an effective projecting range of the image projected on the screen by the optical system PL. Then, the following condition is also satisfied:

$$0.10 < |IMG/fdch| < 0.30 \quad (3)$$

In the case where the optical element includes a positive lens and a negative lens, the combined Abbe number vdch and the combined focal length fdch are given as follows. Let fp be a focal length of the positive lens included in the optical element, vp be an Abbe number of the material of the positive lens included in the optical element, fn be a focal length of the negative lens included in the optical element, and vn be an Abbe number of the material of the negative lens included in the optical element. Then, the combined focal length fdch of the optical element is given as follows:

$$1/fdch = 1/fp + 1/fn$$

The combined Abbe number vdch is given as follows:

$$1/(fdch \times vdch) = 1/(fp \times vp) + 1/(fn \times vn)$$

Therefore, $$vdch = 1/[fdch \times \{1/(fp \times vp) + 1/(fn \times vn)\}]$$

Next, the meaning of the above conditions is described. The conditional expression (1) specifies the combined Abbe number of the material of the optical element used for correction of color shift. In the case where the optical element is a single lens, this condition specifies the Abbe number of the material of the single lens. If the upper bound of condition (1) is exceeded, the amount of parallel decentration of the optical element becomes large upon correcting color shift, leading to large decentering coma and large tilt of the image plane. This is undesirable.

The conditional expression (2) specifies the range of the product of the pixel pitch of the image display element and the focal length of the optical element. If the lower bound of condition (2) is exceeded, the power of the optical element is so high as to make decentering coma and tilt of the image plane large when the optical element is decentered. This is undesirable. If the upper bound of condition (2) is exceeded, the power of the optical element is so low as to make the amount of parallel decentration of the optical element unduly large upon correcting color shift. This is also undesirable. If the amount of parallel decentration of the optical element becomes too large, effective beams are vignetted in one side of the optical element. To avoid this, it is necessary to increase the size of the optical element, resulting in an undesirably large optical element.

The conditional expression (3) specifies the value obtained by dividing the size of the effective projecting range on the reduction conjugate side in which an image can be projected by the optical system PL by the combined focal length of the optical element. In the range below the lower bound of condition (3), the power of the optical element becomes so low as to make the amount of parallel decentration of the optical element unduly large upon correcting color shift. This is undesirable. In the range above the upper bound of condition (3), the power of the optical element becomes so high as to make decentering coma and tilt of the image plane large when the optical element is decentered. This is undesirable. More preferably, the numerical ranges in the conditional expressions (1) to (3) are set as follows:

$$\nu dch < 30 \quad (1a)$$

$$0.7(\text{mm}^2) < |P \times fdch| < 1.1(\text{mm}^2) \quad (2a)$$

$$0.12 < |IMG/fdch| < 0.28 \quad (3a)$$

As described above, in each embodiment, the optical system is composed of a plurality of lenses or lens units, and color shift (or decentering lateral chromatic aberration) in directions perpendicular to the optical axis on the optical axis caused by decentration of a lens(es) occurring when individual lenses are assembled into the lens barrel can be corrected.

In the embodiments, it is more preferred that one or more of the following conditions be satisfied. Let L be an equivalent air length from the optical element to the reduction conjugate point, in the case where the optical element is disposed closest to the reduction conjugate point side in the optical system PL. The sensitivity Δch of color shift on the reduction conjugate plane with respect to the F-line and the C-line per 1-millimeter shift of the optical element in a direction perpendicular to the optical axis is expressed by the following equation:

$$\Delta ch = L/(fdch \times \nu dch)$$

Let Nch be an average refractive index of the materials of the optical element. The optical element consists of a cemented lens made up of a positive lens and a negative lens that are cemented together, Nchn be a refractive index of the material of the negative lens included in the optical element with respect to the d-line, and Nchp be a refractive index of the material of the positive lens included in the optical element with respect to the d-line. Then, it is preferred that one or more of the following conditions be satisfied:

$$0.7 < \Delta ch/P < 4.9 \quad (4)$$

$$Nch > 1.65 \quad (5)$$

$$|Nchn - Nchp| < 0.1 \quad (6)$$

Next, it is described how to derive the equation expressing the sensitivity Δch with respect to the optical element for color shift correction. Here, Δch represents the amount of color shift (color shift sensitivity) with respect to the F-line and the C-line on the reduction conjugate plane per 1-millimeter shift of the optical element for color shift correction.

Let L be a distance from the reduction conjugate side principal point of the optical element for color shift correction to the reduction conjugate point, fFch be a combined focal length of the optical element for color shift correction for the F-line, fCch be a combined focal length of the optical element for color shift correction for the C-line, fdch be a combined focal length of the optical element for color shift correction with respect to the d-line, and νdch be a combined Abbe number of the optical element for color shift correction. Then, the sensitivity Δch is expressed as follows:

$$\Delta ch = L/fFch - L/fCch$$

$$= L \times (1/fFch - 1/fCch)$$

$$= L \times \{(fCch - fFch)/(fFch \times fCch)\}$$

$$= L \times (fCch - fFch)/fdch^2$$

$$= L \times (fdch/\nu dch)/fdch^2$$

$$= L/(fdch \times \nu dch)$$

The color shift sensitivity for wavelengths of 470 nm (blue) and 550 nm (green) is equal to approximately 70% of the value Δch. The color shift sensitivity for wavelengths of 620 nm (red) and 550 nm (green) is equal to approximately 30% of the value Δch.

Here, it is described how to derive the equation "fCch−fFch=fdch/νdch" (the left side and the right side being nearly equal to each other). Here, let νd be an Abbe number, nd be a refractive index with respect to the d-line, nF be a refractive index for the F-line, and nC be the refractive index for the C-line. Then, the definition of the Abbe number reads:

$$\nu d = (nd-1)/(nF-nC)$$

This equation can be transformed as follows:

$$(nd-1) = (nF-nC) \times \nu d$$

Let fd be a focal length of a single lens with respect to the d-line, R1 be a curvature radius of the magnification conjugate side lens surface of the single lens, and R2 be a curvature radius of the reduction conjugate side surface of the single lens. Then, the following relation holds among the focal length fd, refractive index nd, curvature radii R1 and R2 of the single lens:

$$1/fd = (nd-1) \times (1/R1 - 1/R2)$$

From the equations above, the latter equation can be transformed as follows:

$$(nd-1) = 1/(fd \times (1/R1 - 1/R2))$$

$$(nF-nC) \times \nu d = 1/(fd \times (1/R1 - 1/R2))$$

$$(nF-nC) = 1/(fd \times (1/R1 - 1/R2) \times \nu d)$$

$$(nF-nC) \times (1/R1 - 1/R2) = 1/(fd \times \nu d)$$

$$(nF-1) \times (1/R1 - 1/R2) - (nC-1) \times (1/R1 - 1/R2) = 1/(fd \times \nu d)$$

$$1/fF - 1/fC = 1/(fd \times \nu d)$$

$$(fC-fF)/(fF \times fC) = 1/(fd \times \nu d)$$

$$fC - fF = (fF \times fC)/(fd \times \nu d)$$

Here, it is assumed that $fF \times fC \approx fd^2$ (nearly equal, namely the difference is ±10% or less). Then, the following equation holds:

$$fC-fF \approx fd^2/(fd \times vd)$$

$$fC-fF \approx fd/vd \text{ (nearly equal)}$$

Next, the technical meaning of the aforementioned conditions is described. The conditional expression (4) limits the value obtained by dividing the amount of color shift with respect to the F-line and the C-line on the reduction conjugate plane per 1-millimeter shift of the optical element for color shift correction (color shift sensitivity) by the pixel pitch of the image display element. In the range below the lower bound of condition (4), the color shift sensitivity is so small that an undesirably large parallel decentration of the optical element is needed to correct color shift. In the range above the upper bound of condition (4), the color shift sensitivity is so large that a minute parallel decentration of the optical element causes an excessively large change in the color shift. This is undesirable, because fine adjustment is difficult.

The conditional expression (5) limits the average refractive index of the materials of the optical element. If the lower bound of condition (5) is exceeded, the curvature radius of the lens surfaces of the lenses included in the optical element will become small, leading to large decentering coma and large tilt of image plane when the parallel decentration of the optical element is performed to correct color shift. This is undesirable.

The conditional expression (6) limits the absolute value of the difference between the refractive indices of the negative lens and the positive lens in the optical element, in the case where the optical element is a cemented lens formed by cementing the negative lens and the positive lens together. In the range above the upper bound of condition (6), large spherical aberration will be generated by the cemented lens surface in the optical element, and large decentering coma will be generated when parallel decentration is performed. This is undesirable. It is more preferred that the numerical ranges of conditions (4) to (6) be modified as follows:

$$1.5 < \Delta ch/P < 4.4 \quad (4a)$$

$$Nch > 1.70 \quad (5a)$$

$$|Nchn - Nchp| < 0.06 \quad (6a)$$

In each embodiment, the optical element includes a positive lens and a negative lens and has a positive refractive power as a whole. The Abbe number of the material of the positive lens is smaller than the Abbe number of the material of the negative lens. In the case where the optical system is a zoom lens having a magnification-varying lens unit, the optical element is arranged in the reduction conjugate side of the magnification-varying lens unit.

Now, the configuration of the optical system PL used in the image projecting apparatuses according to the first and the second embodiments shown in FIGS. 1 and 3 will be described. The embodiments shown in FIGS. 1 and 3 have the same lens configuration. Here, i denotes an order of a lens unit counted from the magnification conjugate side to the reduction conjugate side, hence Bi denotes the i-th lens unit. The optical system PL shown in FIG. 1 includes, in order from the magnification conjugate side, a first lens unit B1 having a negative refractive power composed of a lens L1, a second lens unit B2 having a negative refractive power composed of lenses L2 to L5, a third lens unit B3 having a positive refractive power composed of lenses L6 and L7, a stop S, and a fourth lens unit B4 having a positive refractive power composed of lenses L8 to L14. With a change in the distance with a change in the position of the screen S from infinity on the magnification conjugate side to a close distance, the second lens unit B2 and the third lens unit B3 both move toward the reduction conjugate side in such a way that the distance between the second lens unit B2 and the third lens unit B3 increases, thereby performing focusing.

In the first and second embodiments, a correction of color shift in a direction perpendicular to the optical axis that is caused by parallel decentration occurring upon assembly of lens units into the lens barrel (not shown) is performed in the following manner. In the case of the first embodiment shown in FIG. 1, the positive lens (optical element) L14 located closest to the reduction conjugate side in the fourth lens unit B4 is shifted in a direction perpendicular to the optical axis to perform the correction. The positive lens L14 is made of a material having an Abbe number of 22.76 and has high dispersion accordingly. Therefore, the correction of color shift can be achieved by a small amount of parallel decentration. In addition, the refractive index of the material is as high as 1.808095. Therefore, since the curvature radius of the lens surfaces can be made large for its power (a refractive power is reciprocal of a focal length), the spherical aberration is small, and it is easy to lessen the change of the decentering coma and the tilt of image plane caused by the parallel decentration.

It is assumed, for example, in numerical embodiment 1 described later that the maximum decentration amount in the parallel decentration of the lens units is 0.05 mm and the maximum amount of the parallel decentration in the lens units is 0.01 mm. The maximum amount of color shift on the optical axis is calculated based on the decentration amount of every lens and lens unit and the product of the direction of every lens and lens unit about the optical axis and a random number, so that the color shift is calculated as 0.0038 mm with respect to the wavelengths of 470 nm (blue) and 550 nm (green).

If this lens is applied to a projector using a liquid crystal panel having a pixel pitch of 0.008 mm, color shift as large as approximately half the pixel pitch is generated, resulting in great deterioration in the resolution. In particular, in a peripheral region of a screen, color shift associated with a lateral chromatic aberration generated by the projection lens per se is also added to the color shift described above, hence color shift as large as approximately the pixel pitch may be generated. This results in large deterioration in the resolution. In this embodiment, the color shift of 0.0038 mm with respect to wavelengths of 470 nm (blue) and 550 nm (green) can be reduced to zero by shifting the positive lens L14 by 0.28 mm in a direction perpendicular to the optical axis.

The optical system in the second embodiment shown in FIG. 3 has the same lens configuration as the optical system in the first embodiment, but the lens used for correction of color shift in the second embodiment is different from that in the first embodiment. In the second embodiment shown in FIG. 3, the color shift in a direction perpendicular to the optical axis that is caused by parallel decentration occurring upon assembly of lens units into the lens barrel (not shown) is corrected by shifting the third lens unit (optical element) B3 in a direction perpendicular to the optical axis. In the third lens unit B3, the positive lens L6 is made of a material having an Abbe number of 28.46, and the negative lens L7 is made of a material having an Abbe number of 55.53. Thus, the material of the positive lens L6 has higher dispersion. Therefore, the third lens unit B3 is a chromatic lens, and correction of color shift can be achieved easily by a small shift of the third lens unit B3.

The material of the positive lens L6 has a refractive index of 1.72825, and the material of the negative lens L7 has a refractive index of 1.696797. The refractive indices of both of the positive lens L6 and the negative L7 are somewhat high, and the difference between them is small. Thus, the third lens unit B3 has a lens configuration that generates small spherical aberration overall. Therefore, if a parallel decentration of the third lens unit B3 occurs, decentering coma generated thereby will be small. Furthermore, since rays are substantially afocal in the gap between the third lens unit B3 and the fourth lens unit B4 in this lens configuration, tilt of image plane caused by a parallel decentration of the third lens unit B3 is small. It is assumed, for example, in numerical embodiment 2 described later that the maximum decentration amount in parallel decentration of the lens units is 0.05 mm, and the maximum amount of parallel decentration in the lens units is 0.01 mm. The maximum amount of color shift on the optical axis is calculated based on the decentration amount of every lens and lens unit and the product of the direction of every lens and lens unit about the optical axis and a random number, so that the color shift is calculated as 0.0038 mm with respect to the wavelengths of 470 nm (blue) and 550 nm (green). If this lens is applied to a projector using a liquid crystal panel having a pixel pitch of 0.008 mm, color shift as large as approximately half pixel pitch will be generated, resulting in great deterioration in the resolution. In this embodiment, the color shift of 0.0038 mm with respect to wavelengths of 470 nm (blue) and 550 nm (green) can be reduced to zero by shifting the third lens unit B3 by 0.15 mm in a direction perpendicular to the optical axis.

The configuration of the optical system PL used in the image projection apparatus according to the third embodiment shown in FIG. 5 is described. The optical system shown in FIG. 5 is a seven-unit zoom lens having seven lens units. The optical system PL shown in FIG. 5 includes, in order from the magnification conjugate side to the reduction conjugate side, a first lens unit 10 for focusing having a negative refractive power composed of lenses G1 to G4, a second lens unit 20 for focusing having a positive refractive power composed of a lens G5, a third lens unit 30 having a positive refractive power composed of a lens G6, a fourth lens unit 40 having a positive refractive power composed of a lens G7, a fifth lens unit 50 having a positive refractive power composed of a lens G8, a sixth lens unit 60 having a negative refractive power composed of lenses G9 to G13, and a seventh lens unit 70 having a positive refractive power composed of lenses G14 and G15.

During zooming from the wide angle end to the telephoto end, the third lens unit 30, the fourth lens unit 40, the fifth lens unit 50, and the sixth lens unit 60 are moved along the optical axis as indicated by arrows. Furthermore, corresponding to position change of the screen S moving from infinity to a closer position on the magnification conjugate side, both of the 1st lens unit 10 and the 2nd lens unit 20 move to the reduction conjugate side respectively to increase the gap therebetween, thereby performing focusing. Color shift on the optical axis occurs due to parallel decentration of lenses G1 to G15 upon assembling the lenses into a lens barrel (not shown). The color shift is corrected by shifting the seventh lens unit (optical element) 70 in a direction perpendicular to the optical axis.

The seventh lens unit 70 consists of a cemented lens (chromatic lens) made up of a positive lens G14 and a negative lens G15 that are cemented together. The positive lens G14 is made of a material having an Abbe number of 22.76 and a refractive index of 1.808095, and the negative lens G15 is made of a material having an Abbe number of 37.16 and a refractive index of 1.834. The combined Abbe number of the materials of the seventh lens unit 70 is 14.675, and the combined focal length of the seventh lens unit 70 is 115.717. The combined Abbe number of the materials of the seventh lens unit 70 is small, and chromatic dispersion of the seventh lens unit 70 is large. Therefore, correction of color shift can be achieved easily by a small amount of parallel decentration of the seventh lens unit 70. In addition, the refractive indices of the materials of the positive lens G14 and the negative lens G15 in the seventh lens unit 70 are high, and the difference in the refractive index between the material of the positive lens G14 and the material of the negative lens G15 is small. Therefore, spherical aberration and field curvature generated by them is small, and a change in decentering coma and tilt of image plane is hard to occur even if parallel decentration occurs. Furthermore, since the seventh lens unit 70 is arranged in such a way that off-axial principal rays are substantially perpendicular to the reduction conjugate plane, a change in decentering coma and tilt of image plane is hard to occur even if parallel decentration occurs.

It is assumed, for example, in numerical embodiment 3 described later that the maximum decentration amount in parallel decentration of the lens units is 0.05 mm, and the maximum amount of parallel decentration in the lens units is 0.01 mm. The maximum amount of color shift on the optical axis is calculated based on the decentration amount of every lens and lens unit and the product of the direction of every lens and lens unit about the optical axis and a random number, so that the color shift is calculated as 0.0030 mm with respect to the wavelengths of 470 nm (blue) and 550 nm (green). If this lens is applied to a projector using a liquid crystal panel having a pixel pitch of 0.008 mm, color shift as large as approximately half the pixel pitch is generated, resulting in great deterioration in the resolution. In this embodiment, the color shift of 0.0030 mm with respect to wavelengths of 470 nm (blue) and 550 nm (green) can be reduced to zero by shifting the seventh lens unit 70 by 0.16 mm in a direction perpendicular to the optical axis.

FIGS. 7A and 7B are schematic view of the structure of the parallel decentration adjusting mechanism according to the present invention. In FIGS. 7A and 7B, a lens barrel 1 holds a lens (or lens unit) that shifts in a direction perpendicular to the optical axis. The lens barrel 1 has three coaxial rollers 4A, 4B, and 4C arranged at equiangular intervals along the circumference of the lens barrel 1 and three eccentric rollers 6A, 6B, and 6C arranged at equiangular intervals along the circumference of the lens barrel 1. A fixed barrel 2 that holds the lens barrel 1 has elongated holes 3A and 5A, elongated holes 3B and 5B, and elongated holes 3C and 5C that are arranged at equiangular intervals along the circumference of the fixed barrel 2. The elongated holes 3A, 3B, and 3C oriented perpendicularly to the elongated holes 5A, 5B, and 5C respectively. By turning the eccentric rollers 6A, 6B, and 6C, the lens barrel 1 can be shifted in the direction perpendicular to the optical axis of the lens. For example, by turning the eccentric roller 6A, parallel decentration in the horizontal direction in FIG. 7B (left/right direction on the paper) can be achieved. By turning the eccentric roller 6B, parallel decentration in the direction from upper left to lower right in FIG. 7B can be achieved. By turning the eccentric roller 6C, parallel decentration in the direction from upper right to lower left in FIG. 7B can be achieved. Thus, by turning three eccentric rollers 6A, 6B, and 6C, parallel decentration of the lens barrel 1 in horizontal and vertical directions to a desired position can be achieved.

The positive lens L14, the third lens unit B3, and the seventh lens unit 70 for color shift adjustment shown in FIGS.

1, 3, and 5 respectively are held in a lens barrel like that shown in FIGS. 7A and 7B to enable color shift adjustment. FIG. 8 is a cross sectional view of a main part of a lens barrel structure that can fix a lens after the lens is shifted in the direction perpendicular to the optical axis according to the present invention. A shiftable barrel 8 has a surface opposed to a fixed barrel and extending perpendicularly to the optical axis 15. The position of the shiftable barrel 8 is adjusted with respect to directions perpendicular to the optical axis 15 by an adjusting apparatus (not shown), and then the shiftable barrel 8 is fixed to the fixed barrel 7 by holding members or screws 11, 13. The size of screw holes 9, 14 of the shiftable barrel 8 is larger than the diameter of screws 11, 13, hence it is possible to shift the shiftable barrel 8 in the directions perpendicular to the optical axis 15.

With the structure described above, the optical axis of a lens 12 held by the shiftable barrel 8 can be moved relative to the optical axis of a lens 16 held by the fixed barrel 7. With the structure of the barrels shown in FIG. 8, the shiftable barrel that holds the lens to be shifted in the direction perpendicular to the optical axis can perform adjustment of parallel decentration of the lens. The structure of the embodiments can be applied to an image pickup apparatus such as a TV camera or a video camera by replacing the liquid crystal panel LCD with a solid state image pickup element such as a CCD. If this is the case, the parameters associated with the image display element in the conditions presented above may be regarded as parameters associated with the solid state image pickup element without change.

According to each embodiment described above, it is possible to provide a projector system including very high resolution in which the color shift on the screen is very small regardless of the lens of the projector being of interchangeable type. The present invention is effective not only for a projector that projects a plurality of original images onto a screen to provide a color image but also for a projector with an interchangeable lens that projects a single original image. The present invention may also be applied to a shooting lens that is used with an image pickup element having a small pixel pitch such as a CCD sensor or a CMOS sensor.

According to the present invention, correction of color shift is enabled without providing an additional optical element for color shift correction in the optical system having an optical element for color shift correction. Therefore, a high performance optical system with small color shift that is small in size and simple in structure as compared to prior systems can be achieved. The present invention can be applied not only to projectors but also to interchangeable lenses for digital cameras and video cameras that use, as an image pickup element, a CCD or CMOS sensor that can provide very high definition images. If the present invention is applied to such interchangeable lenses, images with very small color shift can be obtained.

Figure 9:
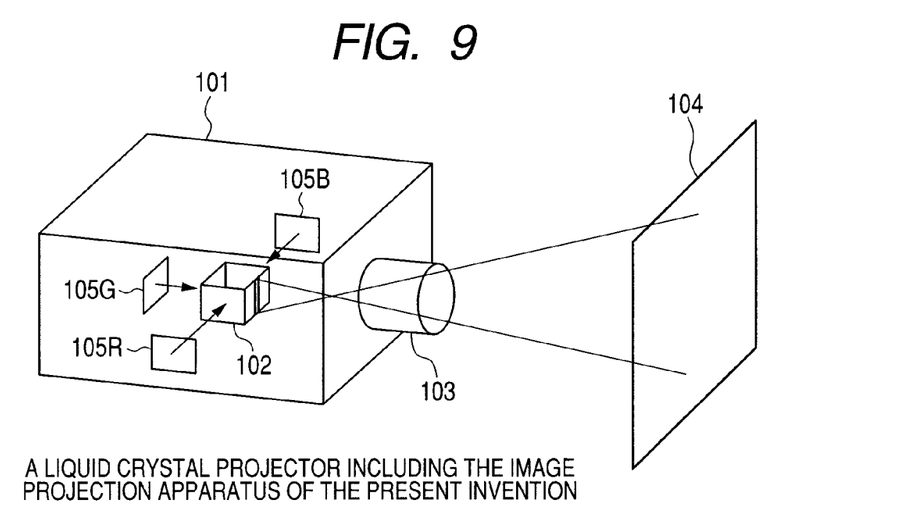
FIG. 9 is a schematic view of a main part of a color liquid crystal projector.

FIG. 9 is a schematic view of a main part of an image projecting apparatus according to an embodiment of the present invention. In the apparatus shown in FIG. 9, the zoom lens described above is used in a liquid crystal color projector of a three-panel type, and a plurality of colors of lights representing image information produced by a plurality of liquid crystal panels are combined by color combining unit or a prism 102. FIG. 9 illustrates an image projecting apparatus which projects and magnifies an image by the zoom lens 103 onto a screen surface 104. The liquid crystal color projector 101 shown in FIG. 9 combines lights of respective colors R (red), G (green), and B (blue) coming from three liquid crystal panels 105R, 105G, and 105B for R, G, and B into a single optical path using the prism 102. Then, an image is projected onto the screen 104 by the projection lens 103, which is one of the zoom lenses described above. As described above, the zoom lenses according to the embodiments can suitably be applied to a projector apparatus that projects and magnifies an image onto a screen located at a finite distance.

Figure 10:
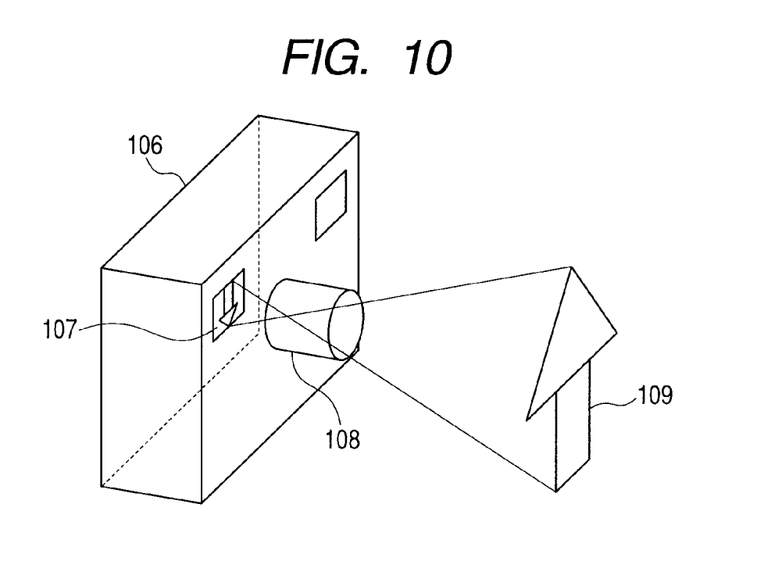
FIG. 10 is a schematic view of a main part of an image pickup apparatus.

FIG. 10 is a schematic view of a main part of an image pickup apparatus according to an embodiment of the present invention. In this embodiment, the zoom lens described above is used as a shooting lens in an image pickup apparatus 106 such as a video camera, film camera or digital camera. In the apparatus shown in FIG. 10, an image of an object 109 is formed on a photosensitive member 107 by the shooting lens 108, and the image information is obtained.

In the following, numerical embodiments 1 and 3 are shown, which correspond respectively to the first and the third embodiments. The numerical embodiment of the second embodiment is same as that of the numerical embodiment 1. In each numerical embodiment, i denotes an order of an optical surface counted from the magnification conjugate side (front side) to the reduction conjugate side. In the numerical data, f denotes the focal length and F denotes the numerical aperture ratio (or F-number) F. Further, ri denotes the curvature radius of the i-th surface from the object side. di denotes the gap between the i-th surface and the (i+1)-th surface (optical surface). ni denotes the refractive index of the i-th optical member from the object side with respect to the d-line, and νi denotes the Abbe number of the i-th optical member from the magnification side with respect to the d-line.

The aspheric surface is indicated by adding * as a suffix to surface number, and their aspherical coefficients are presented in section (B) of the numerical data. In numerical embodiments 1 and 3, the three surfaces closest to the reduction conjugate side are flat surfaces of the glass block PR. The aspheric surfaces are expressed by the following equation, where x is the displacement (or distance) from the surface vertex as the reference point in the direction parallel to the optical axis at a height h from the optical axis:

$$x = (h^2/r)/[1+\{1-(1+k)(h/r)^2\}^{1/2}] + A4h^4 + A6h^6 + A8h^8 + A10h^{10} + A12h^{12}$$

where k is a conic constant, A4, A6, A8, A10, and A12 are aspherical coefficients, and r is the paraxial curvature radius. The expression "e−Z" stands for "×10$^{-z}$". A relationship among the conditional expressions described above and various numerical values in Numerical Embodiments is shown in Table 1.

Numerical Embodiment 1
(serving also as numerical embodiment 2)
Unit: mm (A) Lens Configuration
Focal length = 12.7
F-number = 2
Surface Data

| i | r | d | nd | vd |
|---|---|---|---|---|
| 1* | 81.676 | 5.95 | 1.77250 | 49.598 |
| 2 | 30.467 | 25.19 | | |
| 3 | 53.840 | 2.50 | 1.77250 | 49.598 |
| 4 | 25.982 | 12.23 | | |
| 5 | −28.973 | 2.90 | 1.49700 | 81.546 |
| 6 | 123.759 | 11.53 | | |
| 7 | 0 | 8.50 | 1.72047 | 34.708 |
| 8 | −25.985 | 2.05 | 1.80810 | 22.761 |
| 9 | −55.782 | 3.79 | | |
| 10 | 205.639 | 6.95 | 1.72825 | 28.461 |
| 11 | −45.047 | 2.50 | 1.72825 | 55.53 |

Numerical Embodiment 1
(serving also as numerical embodiment 2)
Unit: mm

| | | | | |
|---|---|---|---|---|
| 12 | −132.769 | 42.34 | | |
| 13 | (stop) 0 | 19.31 | | |
| 14 | 158.961 | 3.85 | 1.48749 | 70.236 |
| 15 | −79.516 | 1.91 | | |
| 16 | −321.443 | 2.00 | 1.83481 | 42.714 |
| 17 | 21.124 | 7.45 | 1.48749 | 70.236 |
| 18 | −46.820 | 2.00 | | |
| 19 | 153.948 | 7.25 | 1.48749 | 70.236 |
| 20 | −19.990 | 2.00 | 1.83481 | 42.714 |
| 21 | −200.567 | 2.00 | | |
| 22 | 222.965 | 9.15 | 1.49700 | 81.546 |
| 23 | −26.49 | 2.00 | | |
| 24 | −152.455 | 3.65 | 1.80810 | 22.761 |
| 25 | −63.113 | 3.10 | | |
| 26 | 0 | 44.02 | 1.51633 | 64.142 |
| 27 | 0 | 21.00 | 1.80518 | 25.432 |
| 28 | 0 | | | |

(B) Aspherical Coefficients

| i | K | A4 | A6 | A8 | A10 |
|---|---|---|---|---|---|
| 1 | 0 | 2.52e−6 | −5.32e−10 | 4.87e−13 | −5.77E−18 |

Numerical Embodiment 3
(A) Lens Configuration

| i | r | d | nd | vd |
|---|---|---|---|---|
| 1 | 44.733 | 5.30 | 1.80610 | 33.3 |
| 2 | 22.959 | 8.14 | | |
| 3* | 141.228 | 3.65 | 1.58313 | 59.4 |
| 4* | 30.634 | 14.80 | | |
| 5 | −28.975 | 1.75 | 1.49700 | 81.5 |
| 6 | −100.843 | 0.54 | | |
| 7 | −242.747 | 3.40 | 1.80518 | 25.4 |
| 8 | −71.436 | variable | | |
| 9 | −147.725 | 3.70 | 1.80610 | 33.3 |
| 10 | −63.523 | variable | | |
| 11 | 106.121 | 2.80 | 1.48749 | 70.2 |
| 12 | 695.425 | variable | | |
| 13 | 71.148 | 3.60 | 1.83481 | 42.7 |
| 14 | 437.970 | variable | | |
| 15 | 82.379 | 3.00 | 1.49700 | 81.5 |
| 16 | −326.102 | 1.26 | | |
| 17 | 0 | variable | | |
| 18 | −92.508 | 1.25 | 1.80518 | 25.4 |
| 19 | 26.201 | 7.35 | 1.48749 | 70.2 |
| 20 | −40.587 | 2.06 | | |
| 21 | −26.971 | 1.40 | 1.83481 | 42.7 |
| 22 | 89.874 | 6.60 | 1.51633 | 64.1 |
| 23 | −36.904 | 0.51 | | |
| 24 | 110.525 | 8.80 | 1.49700 | 81.5 |
| 25 | −35.376 | variable | | |
| 26 | 155.701 | 6.00 | 1.80810 | 22.7 |
| 27 | −50.379 | 1.80 | 1.83400 | 37.2 |
| 28 | −212.697 | 3.10 | | |
| 29 | 0 | 44.02 | 1.51633 | 64.1 |
| 30 | 0 | 21.00 | 1.80518 | 25.4 |
| 31 | 0 | | | |

Unit Intervals

| | wide angle | intermediate | telephoto |
|---|---|---|---|
| Focal length | 23.26 | 29.77 | 39.43 |
| d8 | 3.33 | 3.33 | 3.33 |
| d10 | 37.81 | 6.56 | 2.71 |
| d12 | 14.13 | 29.55 | 5 |
| d14 | 34.33 | 30.21 | 38.65 |
| d17 | 3 | 11.08 | 12.2 |
| d25 | 0.51 | 12.37 | 31.2 |

(B) Aspherical Coefficients

| i | K | A4 | A6 | A8 | A10 | A12 |
|---|---|---|---|---|---|---|
| 3 | 0 | 8.19e−6 | −3.00e−8 | 8.12e−11 | −1.21e−13 | 6.36e−17 |
| 4 | 0 | −1.17e−6 | −4.29e−8 | 9.41e−11 | −1.62e−13 | 5.21e−17 |

TABLE 1

| | Numeral embodiment | | |
|---|---|---|---|
| condition | 1 | 2 | 3 |
| (1) | 22.761 | 18.69 | 14.675 |
| (2) | 1.037 | 0.844 | 0.926 |
| (3) | 0.145 | 0.178 | 0.266 |
| (4) | 2.1 | ... | 3.9375 |
| (5) | 1.8081 | 1.7125 | 1.82105 |
| (6) | ... | 0.031 | 0.0259 |
| | fdch = 129.677 (mm) | fp = 50.966 (mm) | fp = 47.29 (mm) |
| | P = 0.0008 (mm) | νp = 28.46 | νp = 22.76 |
| | IMG = 18.8 (mm) | fn = −98.63 (mm) | fn = −79.105 (mm) |
| | Δch = 0.0173 (mm) | νn = 55.53 | νn = 37.16 |
| | L = 51.084 | fdch = 105.5 (mm) | fdch = 115.717 (mm) |
| | | | P = 0.008 (mm) |
| | | | IMG = 26.2 (mm) |
| | | | Δch = 0.030 (mm) |
| | | | L = 51.187 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-230416, filed Oct. 2, 2009, which is hereby incorporated by reference herein in its entirety.

What is claimed is:

1. An image projecting apparatus comprising:
an image display element; and
an optical system that projects an image displayed on the image display element onto a screen, wherein the optical system comprises:
an optical element that shifts in a direction having a component in a direction perpendicular to an optical axis of the optical system; and
an adjusting mechanism that shifts the optical element in a direction having a component in a direction perpendicular to the optical axis,
wherein the following conditions are satisfied:

$\nu dch < 35$, and $0.5 \, (mm^2) < |P \times fdch| < 1.3 (mm^2)$, where vdch is a combined Abbe number of materials of the optical element with respect to a d-line, fdch is a combined focal length of the optical element with respect to the d-line, and P is a pixel pitch of the image display element, and
wherein the optical element is a single lens, or the optical element includes a positive lens and a negative lens,
wherein in a case where the optical element includes the positive lens and the negative lens, vdch is a combined Abbe number of materials of the optical element with respect to a d-line, which is defined by vdch=1/[fdch×{1/(fp×vp)+1/(fn×vn)}], and fdch is a combined focal length of the optical element with respect to the d-line, which is defined by 1/fdch=1/fp+1/fn, where fp is a focal length of the positive lens included in the optical element, vp is an Abbe number of the material of the positive lens included in the optical element, fn is a focal length of the negative lens included in the optical element, and vn is an Abbe number of the material of the negative lens included in the optical element, and wherein in a case where the optical element is a single lens, vdch is a Abbe number of the material of the single lens with respect to the d-line, and fdch is a focal length of the single lens with respect to the d-line.

2. An image projecting apparatus according to claim 1, wherein:

the optical element is located closest to the image display element, and the following condition is satisfied:

0.7<Δch/P<4.9, where Δch is a sensitivity of color shift on the plane image display element with respect to an F-line and a C-line per 1-millimeter shift of the optical element in the direction perpendicular to the optical axis, which is defined by Δch=L/(fdch×vdch), where L is the equivalent air length from the optical element to the image display element.

3. An image projecting apparatus according to claim 1, wherein the following condition is satisfied:

Nch>1.65, where Nch is an average refractive index of the materials of the optical element in a case where the optical element includes the positive lens and the negative lens, or where Nch is a refractive index of the material of the optical element in a case where the optical element is the single lens.

4. An image projecting apparatus according to claim 1, wherein the optical element comprises a cemented lens made up of the positive lens and the negative lens that are cemented together, and the following condition is satisfied:

|Nchn−Nchp|<0.1, where Nchn is a refractive index of the material of the negative lens included in the optical element with respect to the d-line, and Nchp is a refractive index of the material of the positive lens included in the optical element with respect to the d-line.

5. An image projecting apparatus according to claim 1, wherein the optical element comprises the positive lens and the negative lens and has a positive refractive power as a whole, and the Abbe number of the material of the positive lens is smaller than an Abbe number of the material of the negative lens.

6. An image projecting apparatus according to claim 1, wherein the optical system has a magnification-varying lens unit, and the optical element is located in the image display element side of the magnification-varying lens unit.

7. An image projecting apparatus according to claim 1, wherein the optical element is located closest to the image display element.

8. An image projecting apparatus according to claim 1, wherein the optical system further includes a holding member that fixes the optical element to a lens barrel.

* * * * *